(12) United States Patent
Kuscher et al.

(10) Patent No.: US 9,329,764 B2
(45) Date of Patent: May 3, 2016

(54) OVERSCROLL VISUAL EFFECTS

(71) Applicant: Google Inc., Mountain View, CA (US)

(72) Inventors: Alexander Friedrich Kuscher, San Francisco, CA (US); John Nicholas Jitkoff, Palo Alto, CA (US); Glen Murphy, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 214 days.

(21) Appl. No.: 13/843,424

(22) Filed: Mar. 15, 2013

(65) Prior Publication Data

US 2015/0205476 A1 Jul. 23, 2015

(51) Int. Cl.
*G06F 3/0485* (2013.01)
*G06F 3/0482* (2013.01)
*G06F 3/0484* (2013.01)

(52) U.S. Cl.
CPC ............ *G06F 3/0485* (2013.01); *G06F 3/0482* (2013.01); *G06F 3/04845* (2013.01)

(58) Field of Classification Search
None
See application file for complete search history.

(56) References Cited

U.S. PATENT DOCUMENTS

| 8,473,871 | B1* | 6/2013 | Sandler et al. | 715/863 |
|---|---|---|---|---|
| 2009/0058821 | A1* | 3/2009 | Chaudhri et al. | 345/173 |
| 2010/0185989 | A1* | 7/2010 | Shiplacoff | G06F 3/0416 715/856 |
| 2011/0010659 | A1* | 1/2011 | Kim et al. | 715/784 |
| 2011/0055773 | A1* | 3/2011 | Agarawala et al. | 715/863 |
| 2011/0090255 | A1* | 4/2011 | Wilson et al. | 345/647 |
| 2011/0202859 | A1* | 8/2011 | Fong | 715/769 |
| 2012/0266109 | A1* | 10/2012 | Lim et al. | 715/863 |

* cited by examiner

*Primary Examiner* — William Bashore
*Assistant Examiner* — Daniel Parcher
(74) *Attorney, Agent, or Firm* — McDermott Will & Emery LLP

(57) ABSTRACT

Methods for providing visual feedback when an end area of content is reached are provided. In one aspect, a method includes receiving an input in a first direction to at least one of scroll, rotate, or scale a portion of content provided for display, and determining whether an edge of the content in the first direction is reached in response to the input. The method also includes applying a stretch effect to the displayed portion of content when the determination indicates an edge of the content in the first direction is reached. Systems and machine-readable media are also provided.

14 Claims, 6 Drawing Sheets

OVERSCROLL VISUAL EFFECTS

BACKGROUND

1. Field

The present disclosure generally relates to the transmission of data, and more particularly to the use of a computing device to display data.

2. Description of the Related Art

Portable electronic devices often have a limited viewing region (or "viewport") within which to display content. Due to the relatively large amount of content for display in a document or other file, typically a portion of the content in the document may be displayed within the viewport while the remaining content of the document remains outside of the viewport. As a result, a user viewing the content will need to scroll, rotate, or scale the document to view content currently outside the viewport. If the intent of the user in scrolling, rotation, or scaling the content is not reflected by the display of the device (e.g., by providing a visual effect response to the intent of the user), the user may become frustrated.

SUMMARY

According to one embodiment of the present disclosure, a computer-implemented method for providing visual feedback when an end area of content is reached is provided. The method includes receiving an input in a first direction to at least one of scroll, rotate, or scale a portion of content provided for display, and determining whether an edge of the content in the first direction is reached in response to the input. The method also includes applying a stretch effect to the displayed portion of content when the determination indicates an edge of the content in the first direction is reached.

According to another embodiment of the present disclosure, a system for providing visual feedback when an end area of content is reached is provided. The system includes a memory that includes content for display, and a processor. The processor is configured to execute instructions to receive an input in a first direction to at least one of scroll, rotate, or scale a portion of content provided for display, and determine whether an edge of the content in the first direction is reached in response to the input. The processor is configured to execute instructions to apply a stretch effect to the displayed portion of content when the determination indicates an edge of the content in the first direction is reached. The content provided for display is separated by at least one blank space. The stretch effect includes changing an amount of the blank space between the content in response to the input.

According to a further embodiment of the present disclosure, a machine-readable storage medium includes machine-readable instructions for causing a processor to execute a method for providing visual feedback when an end area of content is reached is provided. The method includes receiving an input in a first direction to at least one of scroll, rotate, or scale a portion of content provided for display, and determining whether an edge of the content in the first direction is reached in response to the input. The method also includes applying a stretch effect to the displayed portion of content when the determination indicates an edge of the content in the first direction is reached, and providing, for display, an additional portion of the content when the determination indicates an edge of the content in the first direction is not reached. The content provided for display is separated by at least one blank space. The stretch effect includes increasing an amount of the blank space between the content in response to the input based on a distance of the blank space from the edge of the content.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides visual feedback that indicates whether additional content exists outside a viewport for display. Specifically, when an edge area of content, such as text or images, in a direction is reached by a scrolling, scaling, or rotation input, then blank space between the text or images appears to stretch in response to further scrolling, scaling, or rotation input in that same direction. The stretching effect can, for example, increase blank space (e.g., white space) between content in proportion to the distance of the blank space from the edge. In certain aspects, the increase in the blank space can be uniform for certain content provided for display, or different for different portions of content provided for display. In certain aspects, the stretching effect can include having portions of the content overlap as the input in the direction of the end area increases.

Figure 1:
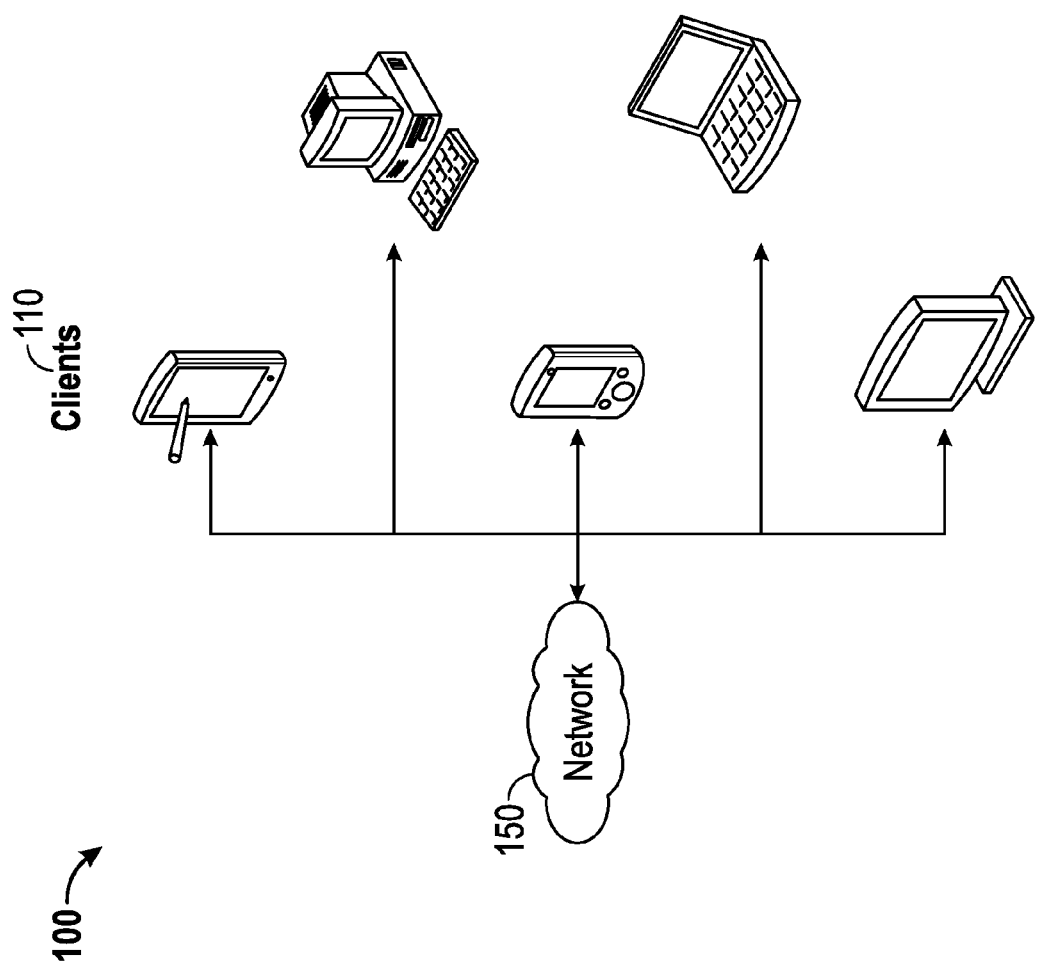
FIG. 1 illustrates an example architecture for providing visual feedback when an end area of content is reached.

FIG. 1 illustrates an example architecture 100 for providing visual feedback when an end area of content is reached. The architecture 100 includes clients 110 connected over a network 150. The clients 110 can be, for example, desktop computers, mobile computers, tablet computers, mobile devices (e.g., a smartphone or PDA), set top boxes (e.g., for a television), video game consoles, or any other devices having appropriate processor, communications capabilities, and memory that can be partitioned. Each client 110 is configured to run an application that displays content, such as text, icons, or images. The application can be, for example, a web browser, operating system interface, document editor, or content viewer. Each client 110 is also configured to receive input requests to adjust the display of content, such as a rotation input request, scale input request, or scroll input request. If the input request is received when an end portion of the content is being displayed, such as a last page of text or a last screen of icons, then the client 110 is configured to display a visual stretching effect for the content so as to make the content appear as though the content is attached in the direction of the input request and cannot be moved, thereby indicating to the user that additional content is not available for display in the direction of the input request.

The stretching effect can be implemented by adjusting a white space between the displayed content evenly or unevenly, adjusting a shape of the content or its background, or by changing an opacity of the content. For example, a straight edge of the displayed content can be stretched to a substantially curved shape in the direction of the input request based on the velocity or distance of the input request. The visual change from a straight edge to a curved edge in response to an input request indicates to the user that additional content is not available for display.

The clients 110 can be connected to a network 150 that can include any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. In certain aspects, a client can connect to a server (not illustrated) over the network 150 to obtain content for display.

Figure 2:
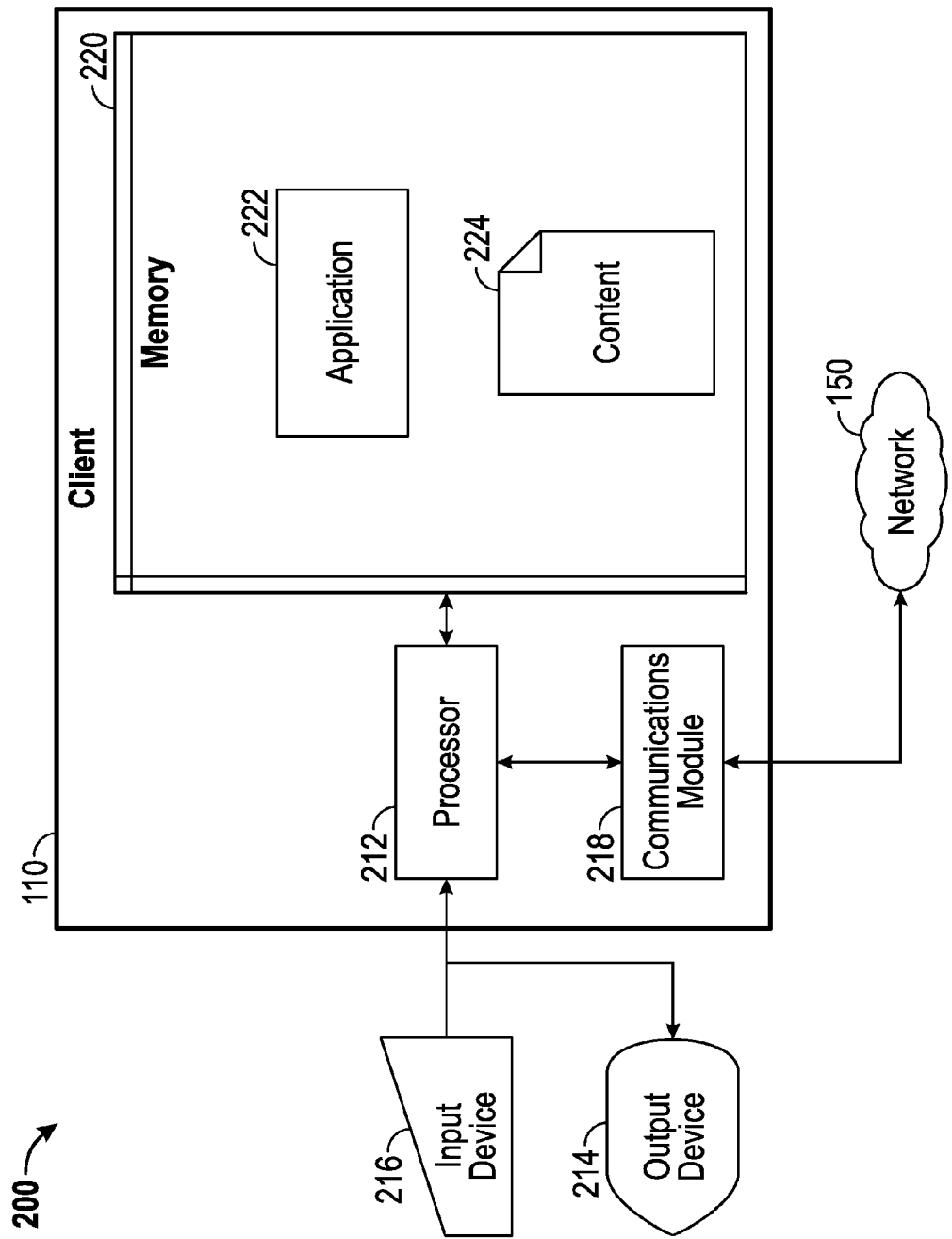
FIG. 2 is a block diagram illustrating an example client from the architecture of FIG. 1 according to certain aspects of the disclosure.

FIG. 2 is a block diagram 200 illustrating an example client 110 in the architecture 100 of FIG. 1 according to certain aspects of the disclosure. The client 110 is connected to the network 150 via a communications module 218. The communications module 218 is configured to interface with the network 150 to send and receive information, such as data, requests, responses, and commands to other devices on the network 150. For example, the communications module 218 can receive content 224 from a server for display in an application 222 on the client 110. The communications modules 218 can be, for example, a modem or Ethernet card.

The client 110 includes a processor 212, the communications module 218, and a memory 220 that includes the application 222 and content 224 for display in the application 222. The application 222 can be, for example, a web browser, operating system interface, document editor, content viewer, or other application that is configured to run on the client 110 and display content 224. The content 224 can be, for example, text or images, such as paragraphs of text, groups of icons, or photographs. The content 224 provided for display can be separated by blank space, such as blank space between and around icons in a grid of icons or blank space between and around paragraphs of text. The client 110 also includes an input device 216, such as a keyboard or mouse, and an output device 214, such as a display for displaying the content 224 in the application 222.

The processor 212 of the client 110 is configured to execute instructions, such as instructions physically coded into the processor 212, instructions received from software in memory 220, or a combination of both. For example, the processor 212 of the client 110 executes instructions from the application 222 to provide visual feedback (e.g., on output device 214) when an end area of content 224 is reached. The instructions include the processor 212 receiving an input in a first direction to at least one of scroll, rotate, or scale a portion of content 224 provided for display. The input is received using an input device 216 such as a mouse or keyboard. The input device 216 and output device 214 can also be provided together, such as by a touchscreen interface. Upon determining that an edge of the content 224 in the first direction is reached in response to the input, the processor 212 applies a stretch effect to the displayed portion of content 224 (e.g., on the output device 214). When, however, the determination indicates an edge of the content 224 in the first direction is not reached, then the processor 212 is configured to provide an additional portion of the content 224 for display. For example, if the content 224 is a document, such as a word processing document, web page document, or document displayed in a mobile or non-mobile app, then the edge of the content 224 can be an edge or border of the document beyond which there is no additional content to display.

In certain aspects, the stretch effect includes adjusting an amount of blank space between the content 224 in response to the input. For example, if a user attempts to scroll a displayed rectangular page of icons in an upwards direction using an input in an upwards direction to view any icons below the displayed page, and there are no pages of icons below the displayed rectangular page, then the bottom edge of the displayed rectangular page can appear to stretch upwards (e.g., by becoming substantially curved in shape) in response to the user's upward input. The adjusted amount can increase, for example, based on the distance of the blank space from the edge of the content 224. For example, blank space near the bottom of the displayed rectangular page can increase in size more than the blank space near the top of the displayed rectangular page, or vice versa.

When the input device 216 and output device 214 include a touchscreen display that displays the content 224 and the input includes a touch and drag of the content 224 on the touchscreen, then the increase in the amount of the blank space between the content 224 in response to the touch input can further be based on a location of the touch input on the touchscreen. For example, using the rectangular page of icons discussed above, if the user places a finger on the touchscreen in a substantially center area of the rectangular page, and the user then drags the user's finger in an upwards direction, then blank space closer to the substantially center area of the rectangular page that is touched by the user will increase more during the dragging motion than blank space farther from the substantially center area of the rectangular page.

In certain aspects, if the content 224 is provided for display inside a window having a border proximal to the edge of the content (e.g., beyond which there is no additional content to display), then a distance between each portion of the border and the edge increases based on a proximity of the touch input to a corresponding portion of the border. For example, the user places a finger on the touchscreen in a substantially center area of the border proximal to the edge of the rectangular page of icons, and the user then drags the user's finger in an upwards direction. Blank space closer to center of the border will increase more than blank space further from the center of the border, such as the corners of the border, thereby making the icons near the center of the border appear to move further away than icons near the corners of the border.

Figure 3:
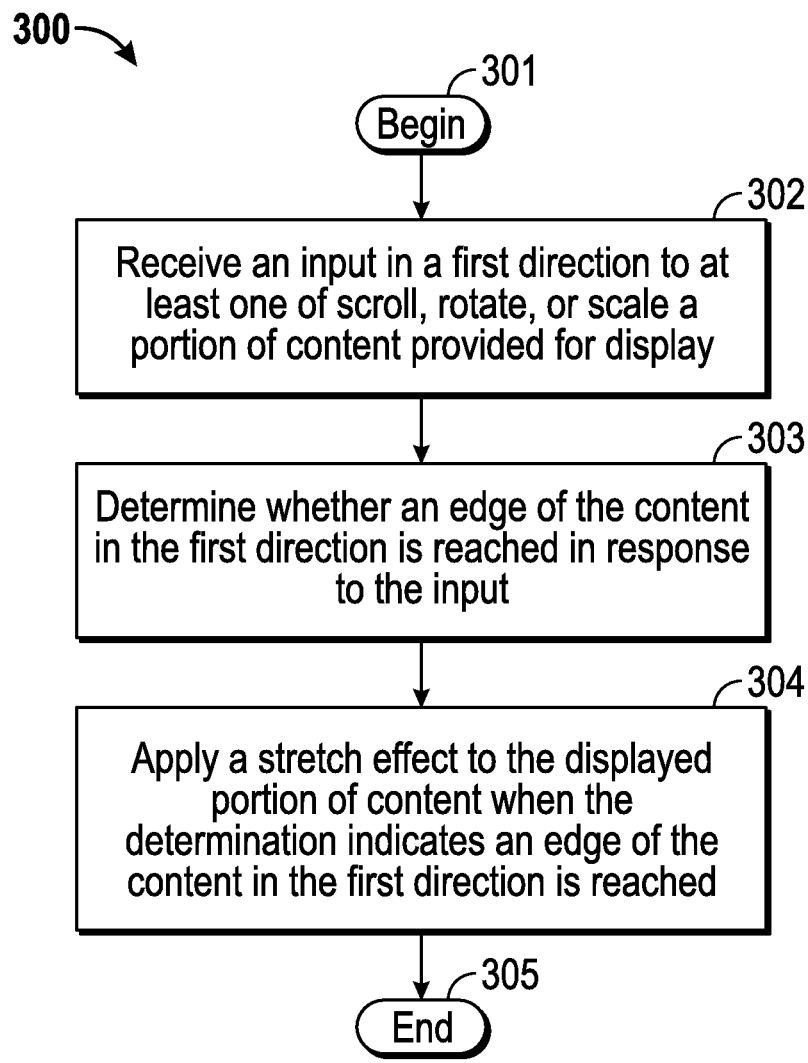
FIG. 3 illustrates an example process for providing visual feedback when an end area of content is reached using an example client of FIG. 2.

FIG. 3 illustrates an example process 300 for providing visual feedback when an end area of content 224 is reached using the example client 110 of FIG. 2. While FIG. 3 is described with reference to FIG. 2, it should be noted that the process steps of FIG. 3 may be performed by other systems. The process 300 begins by proceeding from beginning step 301 when the application 222 is opened to step 302 when an input in a first direction to at least one of scroll, rotate, or scale a portion of content 224 provided for display is received. Next, in step 303, a determination is made whether an edge of the content 224 in the first direction is reached in response to the input. In step 304, when the determination indicates an edge of the content 224 in the first direction is reached, a stretch effect is applied to the displayed portion of content 224. The process 300 then ends in step 305.

FIG. 3 sets forth an example process 300 for providing visual feedback when an end area of content 224 is reached using the example client 110 of FIG. 2. An example will now be described using the example process 300 of FIG. 3, a client 110 that is a desktop computer with a touch screen interface 216, an application 222 that is an operating system interface, and content 224 that is a collection of icons.

Figure 4A:
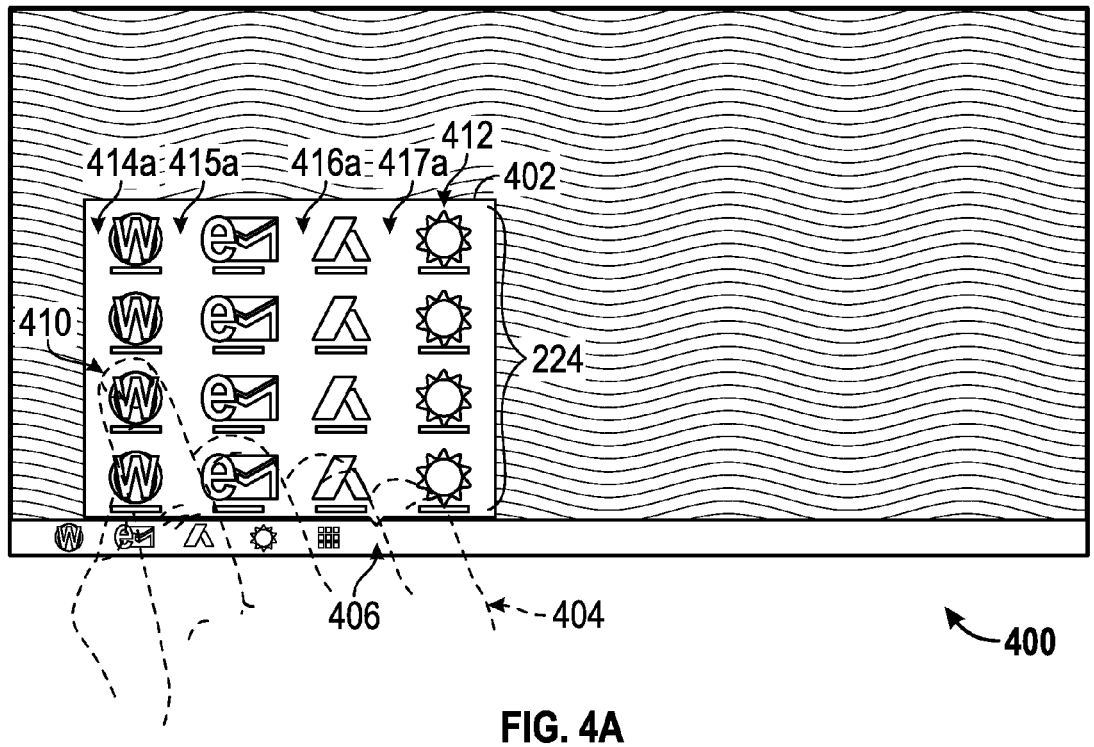
FIGS. 4A-4D are example illustrations associated with the example process of FIG. 3.

As illustrated in the example illustration 400 of FIG. 4A, the process 300 begins by proceeding from beginning step 301 when the operating system interface 222 is opened on the desktop computer 110 and a user opens an applications selection menu 406 on the touchscreen 216 to display a window 402 that includes a displayed grid of application icons 224. There is an even distribution of blank space 414a, 415a, 416a, and 417a between each column of icons. There are no additional icons to display in the window 402 to the left of the displayed grid of application icons 224. The user in step 302 touches 404 a left region 410 of the grid of application icons 224 as illustrated in FIG. 4A, and drags the touch input 404 towards the right 422 to attempt to scroll the displayed grid of application icons 224 towards the right to display any additional icons to the left of the displayed grid of application icons 224 as illustrated in the example illustration 420 of FIG. 4B.

Next, in step 303, it is determined that there are no additional icons to the left of the displayed grid of application icons 224 and that therefore an edge of the displayed grid of application icons 224 in the first direction is reached in response to the input. In step 304, because the determination indicates an edge of the displayed grid of application icons 224 in on the left side is reached, a stretch effect is applied to the displayed grid of icons 224.

Figure 4B:
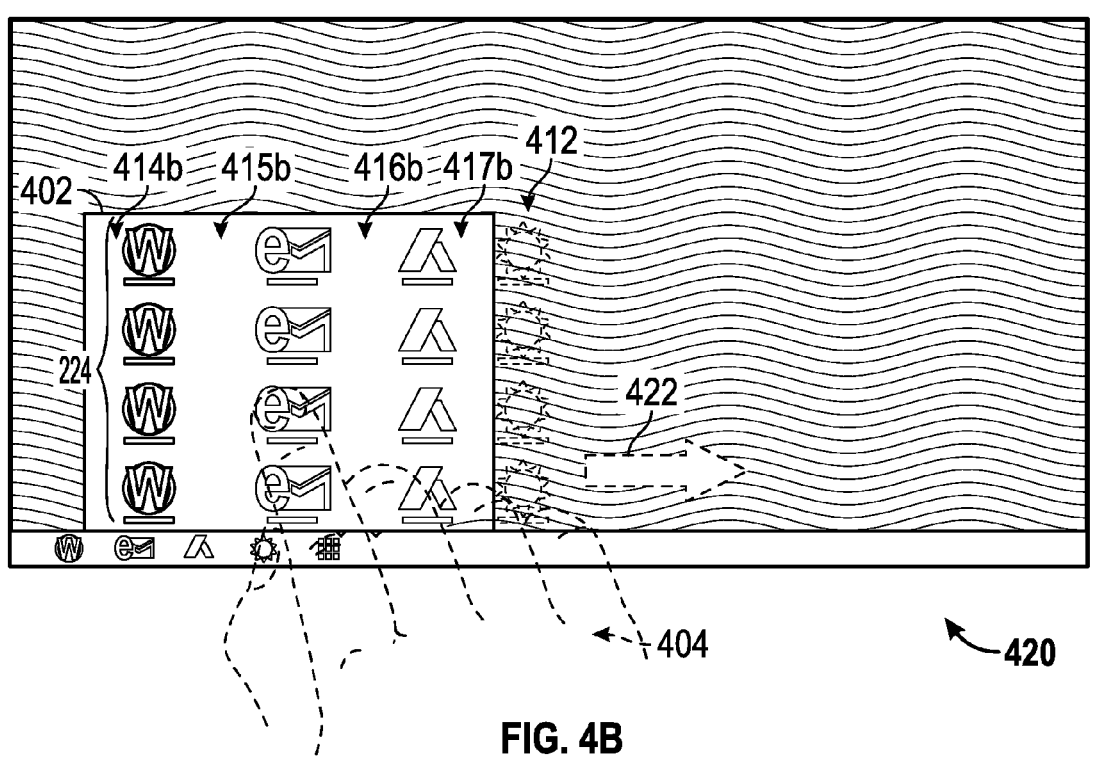

The stretch effect of step 304 can be displayed in various ways. As illustrated in FIG. 4B, the rightmost column of icons 402 that was originally present and opaque within the window 402 can be made substantially transparent when displayed outside of the window 402 in response to the touch input 404. Additionally, the blank space 414a, 415a, 416a, and 417a between each of the columns of icons in the displayed grid of application icons 224 can be increased proportional to the distance of the dragged touch input 404 in the dragged direction 422.

Figure 4C:
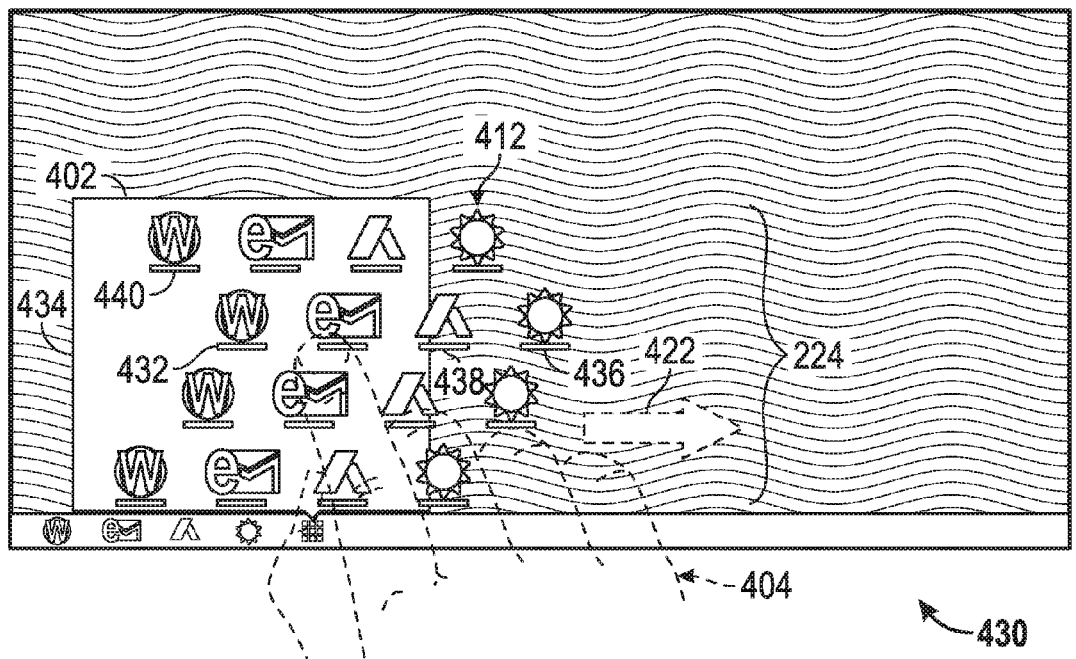

As illustrated in the example screenshot 430 of FIG. 4C, another approach to displaying the stretching effect of step 304 includes increasing the blank space that is between the icon 432 closest to the touch input 404 and the border 434 (e.g., in FIG. 4C, the left border of the window 402) opposite the direction of the drag direction 422 more than an increase in the blank space between the border 434 and another icon 440 that is not closest to the touch input 404. Similarly, the increase in blank space between icons 436 and 438 that are far away from the touch input 404 can be substantially less than the increase in blank space for the icon 432 closest to the touch input. Icons that are displayed outside of the window 402 in response to the touch input 404 can remain substantially opaque.

Figure 4D:
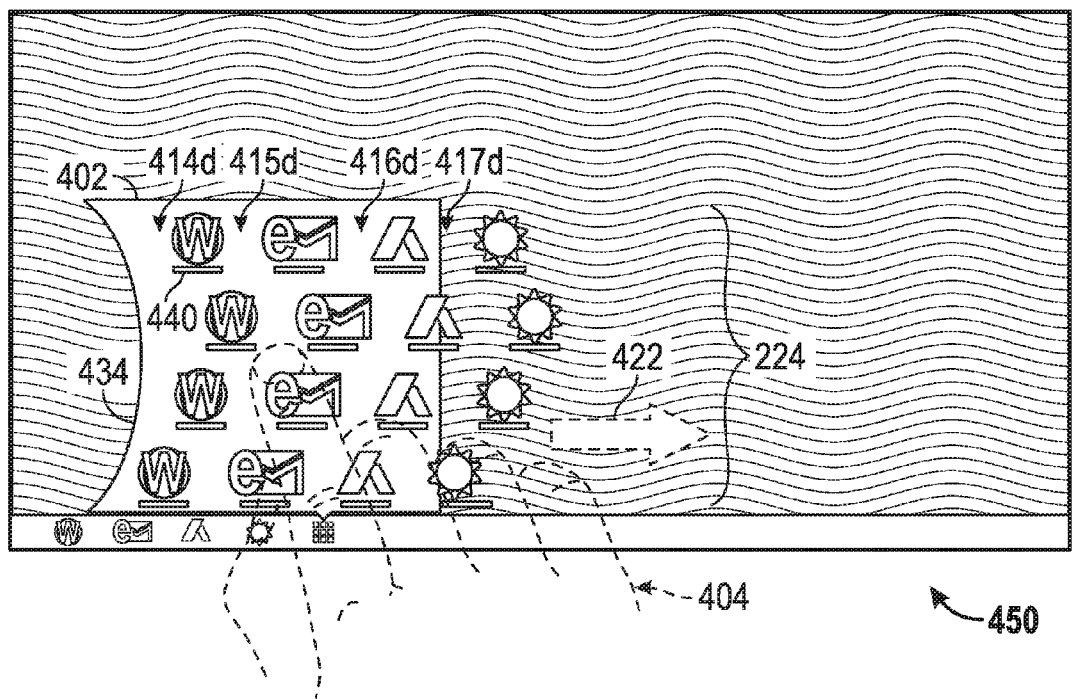

As illustrated in the example screenshot 450 of FIG. 4D, yet another approach to displaying the stretching effect of step 304 includes changing the shape of the border 434 (e.g., in FIG. 4D, the left border of the window 402) opposite the direction of the drag direction 422 by an amount proportional to the distance of the drag input 404 towards the right 422, wherein the change in shape appears substantially more significant closest to an icon 432 nearest the touch input and the border 434 as opposed to an icon 440 that is not closest to the touch input 404. The blank space 414d, 415d, 416d, and 417d between each of the columns of icons in the displayed grid of application icons 224 can be substantially the same in response to the dragged touch input 404 in the dragged direction 422. The process 300 then ends in step 305.

Figure 5:
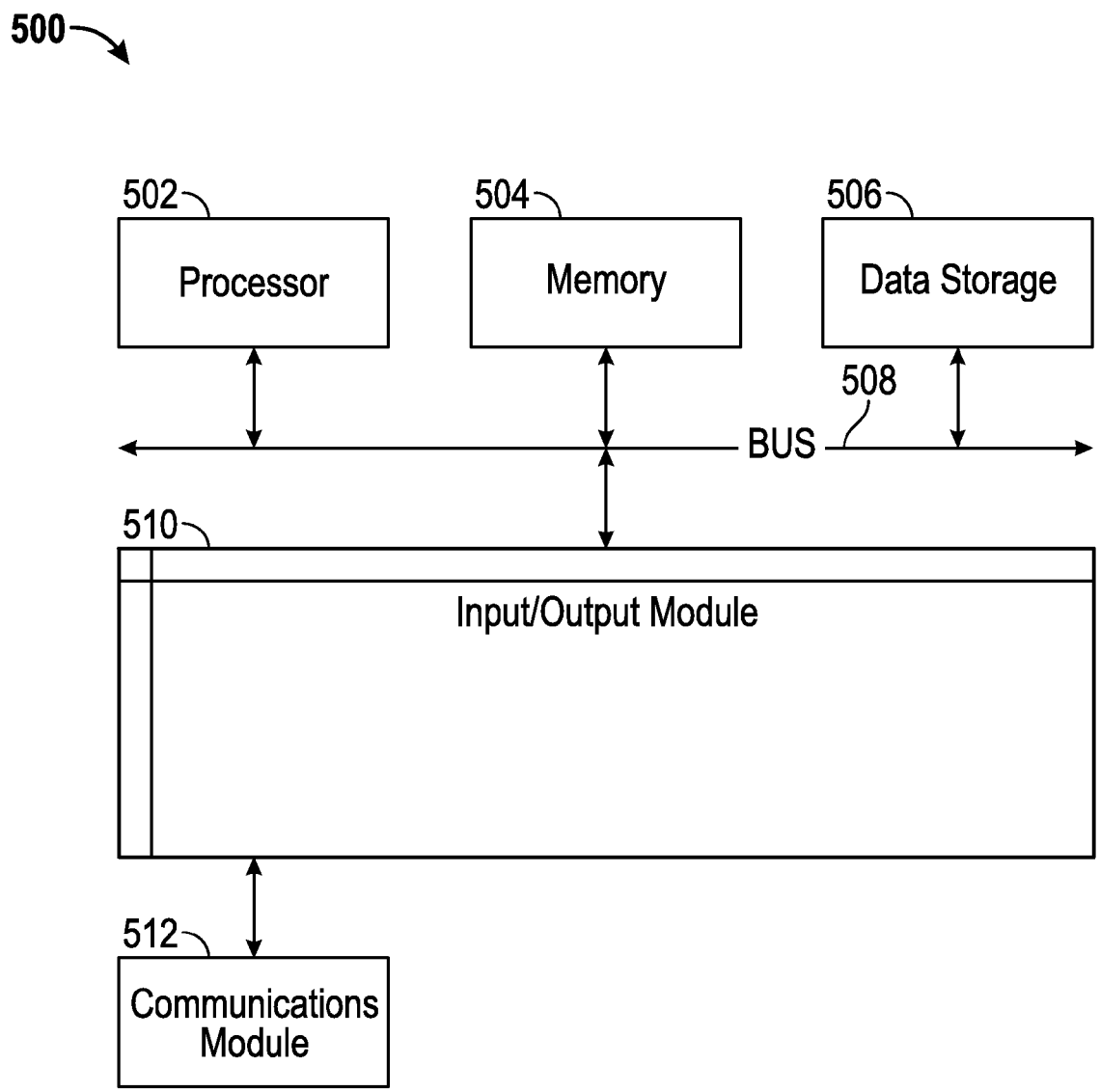
FIG. 5 is a block diagram illustrating an example computer system with which the client of FIG. 2 can be implemented.

FIG. 5 is a block diagram illustrating an example computer system 500 with which the client 110 can be implemented. In certain aspects, the computer system 500 may be implemented using hardware or a combination of software and hardware, either in a dedicated server, or integrated into another entity, or distributed across multiple entities.

Computer system 500 (e.g., client 110a) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourthgeneration languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218) include networking interface cards, such as Ethernet cards and modems. In certain aspects, the input/output module 510 is configured to connect to a plurality of devices, such as an input device (e.g., input device 216) and/or an output device (e.g., output device 214). Example input devices include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices include display devices, such as a LED (light emitting diode), CRT (cathode ray tube), or LCD (liquid crystal display) screen, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "left," "right" and the like as used in this disclosure should be understood as referring to an arbitrary frame of reference, rather than to the ordinary directional frame of reference. Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for providing visual feedback when an end area of content is reached, the method comprising:
  receiving a dragging touch input for a distance in a first direction to at least one of scroll, rotate, or scale a portion of content provided for display on a touchscreen, the portion of content comprising first visible content, second visible content, and third visible content, the first visible content separated from an edge of the content in a second direction opposite the first direction by first blank space, the second visible content separated from the edge by second blank space, and the first visible content separated from the third visible content in the first direction by third blank space, wherein the first blank space is near the location of the dragging touch input on the touchscreen and the second blank space is farther away from the location of the dragging touch input on the touchscreen;
  determining whether the edge of the content to display in response to the dragging input in the first direction is reached; and
  when the determination indicates the edge of the content in the first direction is reached, applying a stretch effect in response to the dragging touch input comprising increasing an amount of the first blank space more than an increase in an amount of the second blank space, and increasing an amount of the third blank space, wherein the increase in the amount of the third blank space and the difference between the increase in the amount of the first blank space and the increase in the amount of the second blank space is based on both a distance of each of the first blank space and the second blank space from the location of the dragging touch input, and a length of the distance of the dragging input in the first direction.

2. The method of claim 1, wherein the content is provided for display inside a window having a border proximal to the edge, and wherein an amount of blank space between each portion of the border and the edge increases based on a proximity of the location of the dragging touch input to a corresponding portion of the border.

3. The method of claim 1, wherein the content provided for display comprises at least one of images or text.

4. The method of claim 1, wherein the content provided for display comprises a grid of icons.

5. The method of claim 1, wherein the content provided for display is a portion of a document, and wherein the edge of the content comprises an edge of the document.

6. The method of claim 1, further comprising when the determination indicates an edge of the content in the first direction is not reached, then providing, for display, an additional portion of the content.

7. The method of claim 1, wherein the increase in the amount of the first blank space and the increase in the amount of the second blank space is proportional to the length of the distance of the dragging input in the first direction.

8. A system for providing visual feedback when an end area of content is reached, the system comprising:
  a memory comprising content for display;
  a processor configured to execute instructions to:
    receive a dragging touch input for a distance in a first direction to at least one of scroll, rotate, or scale a portion of the content provided for display on a touchscreen, the portion of content comprising first visible content, second visible content, and third visible content, the first visible content separated from an edge of the content in a second direction opposite the first direction by first blank space, the second visible content separated from the edge by second blank space, and the first visible content separated from the third visible content in the first direction by third blank space, wherein the first blank space is near the location of the dragging touch input on the touchscreen and the second blank space is farther away from the location of the dragging touch input on the touchscreen;

determine whether the edge of the content to display in response to the dragging input in the first direction is reached; and when the determination indicates the edge of the content in the first direction is reached, apply a stretch effect in response to the dragging touch input comprising increasing an amount of the first blank space more than an increase in an amount of the second blank space, and increasing an amount of the third blank space, wherein the increase in the amount of the third blank space and the difference between the increase in the amount of the first blank space and the increase in the amount of the second blank space is based on both a distance of each of the first blank space and the second blank space from the location of the dragging touch input, and a length of the distance of the dragging input in the first direction.

9. The system of claim 8, wherein the content is provided for display inside a window having a border proximal to the edge, and wherein an amount of blank space between each portion of the border and the edge increases based on a proximity of the location of the dragging touch input to a corresponding portion of the border.

10. The system of claim 8, wherein the content provided for display comprises at least one of images or text.

11. The system of claim 8, wherein the content provided for display comprises a grid of icons.

12. The system of claim 8, wherein the content provided for display is a portion of a document, and wherein the edge of the content comprises an edge of the document.

13. The system of claim 8, wherein the processor is further configured to execute instructions to provide, for display, an additional portion of the content when the determination indicates an edge of the content in the first direction is not reached.

14. A non-transitory machine-readable storage medium comprising machine-readable instructions for causing a processor to execute a method for providing visual feedback when an end area of content is reached, the method comprising:

receiving a dragging touch input for a distance in a first direction to at least one of scroll, rotate, or scale a portion of content provided for display on a touchscreen, the portion of content comprising first visible content, second visible content, and third visible content, the first visible content separated from an edge of the content in a second direction opposite the first direction by first blank space, the second visible content separated from the edge by second blank space, and the first visible content separated from the third visible content in the first direction by third blank space, wherein the first blank space is near the location of the dragging touch input on the touchscreen and the second blank space is farther away from the location of the dragging touch input on the touchscreen;

determining whether the edge of the content to display in response to the dragging input in the first direction is reached;

when the determination indicates the edge of the content in the first direction is reached, applying a stretch effect in response to the dragging touch input comprising increasing an amount of the first blank space more than an increase in an amount of the second blank space, and increasing an amount of the third blank space, wherein the increase in the amount of the third blank space and the difference between the increase in the amount of the first blank space and the increase in the amount of the second blank space is based on both a distance of each of the first blank space and the second blank space from the location of the dragging touch input, and a length of the distance of the dragging input in the first direction; and when the determination indicates the edge of the content in the first direction is not reached, then providing, for display, an additional portion of the content.

* * * * *